United States Patent [19]

Tregillus

[11] 4,008,853
[45] Feb. 22, 1977

[54] PRESSURE RESPONSIVE SELF-PURGING EMITTER

[75] Inventor: Kenneth C. Tregillus, Yellow Springs, Ohio

[73] Assignee: Vernay Laboratories, Inc., Yellow Springs, Ohio

[22] Filed: Oct. 31, 1975

[21] Appl. No.: 627,598

[52] U.S. Cl. ............................................... 239/542
[51] Int. Cl.² ........................................ B05B 15/00
[58] Field of Search ............ 239/533, 542; 138/43, 138/45, 46; 137/512.4, 525.1, 525.3

[56] References Cited

UNITED STATES PATENTS

| | | | |
|---|---|---|---|
| 2,489,932 | 11/1949 | Rosenblum | 138/43 |
| 2,593,315 | 4/1952 | Kraft | 138/45 |
| 2,899,981 | 8/1959 | Binks | 137/525.3 X |
| 3,581,773 | 6/1971 | Warren | 138/46 X |
| 3,780,946 | 12/1973 | Smith et al. | 239/542 X |

FOREIGN PATENTS OR APPLICATIONS

| | | | |
|---|---|---|---|
| 1,009,277 | 4/1955 | France | 138/45 |

*Primary Examiner*—John J. Love
*Attorney, Agent, or Firm*—Biebel, French & Nauman

[57] ABSTRACT

An emitter for use in drip irrigation systems which is both self-purging and pressure responsive to provide substantially constant flow rates with varying inlet pressures. The emitter includes a flow path which consists of a series of interconnected openings in each of which is positioned a valve including a valve lip which extends across the opening in which it is located and is directed in an upstream direction so that as the pressure drop across any one valve increases, the effective area of the flow path at that valve will decrease to maintain a substantially constant flow rate. When the pressure drop at a particular valve increases above a predetermined amount, as when a particle of dirt or other foreign substance clogs the valve, the valve lip travels over center and allows the clogging particle to pass, thereby purging that particular valve and permitting it to return to its normal operating position. The emitter is preferably formed with a resilient central body portion and relatively rigid outer cover plates. In one embodiment the flow path openings and interconnecting passages are formed in the central body portion. In a second embodiment the openings and interconnecting passages are formed in the cover plates and the central body portion comprises a sheet of resilient material having tongues struck therefrom which project into the flow path defined by the contoured cover plates when the emitter components are assembled.

13 Claims, 13 Drawing Figures

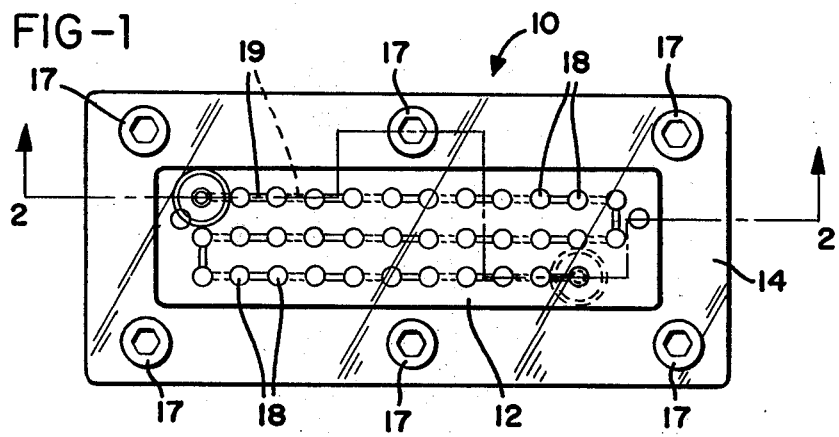
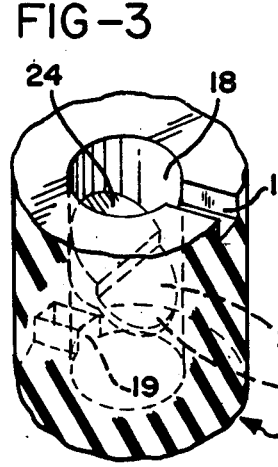

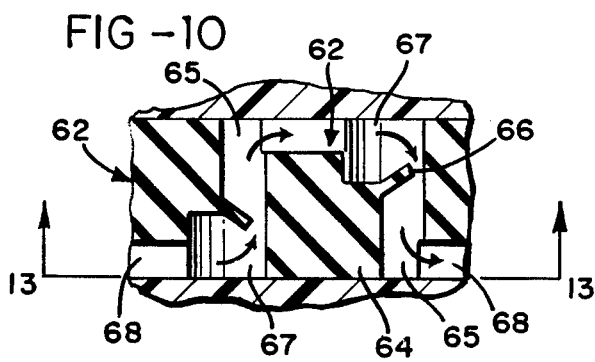
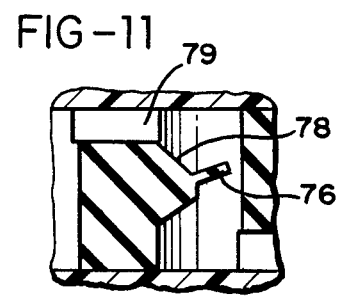
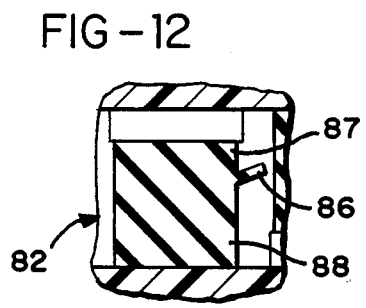
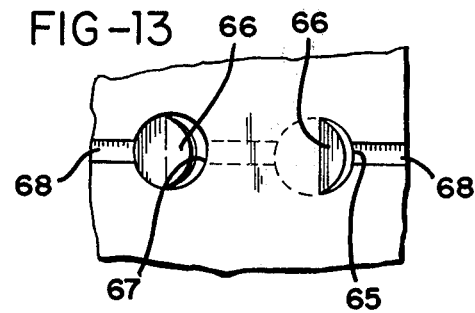

PRESSURE RESPONSIVE SELF-PURGING EMITTER

BACKGROUND OF THE INVENTION

In a drip irrigation system a liquid, such as water and/or a fertilizer or other additive, is delivered directly to each plant in an orchard, vineyard, or other agricultural system in very small, controlled quantities. A number of patents describe emitters designed for drip irrigation systems of this type, such as U.S. Pat. Nos. 3,791,587; 3,546,884; 3,807,430; 3,833,019; and 3,767,124.

Almost all emitters are designed to deliver liquid at relatively low flow rates. For example, a flow rate of approximately one gallon per hour might be desired. A difficulty which arises with many emitter designs is that in decreasing the flow orifice size of the emitter to the degree necessary to achieve the desired low flow rate the emitter becomes increasingly susceptible to clogging by dirt or other foreign particles.

While many drip irrigation systems attempt to combat this problem by periodic back flushing of the system, U.S. Pat. No. 3,780,946 describes an emitter which consists of at least two resilient diaphragms having orifices formed therethrough so that during normal operation the pressure drop across each orifice is equal to the total pressure drop across the entire emitter divided by the number of orifices, but when an orifice becomes clogged, the total pressure drop for the emitter takes place at the clogged orifice, thereby exerting sufficient pressure against the diaphragm in which the clogged orifice is formed to expand the diameter of the orifice and allow the clogging particle to pass through.

With the construction described above although a self-purging action may be attained, it will be apparent that if there are fluctuations in the inlet pressure to the emitter there will be corresponding fluctuations in the flow rate through the emitter. In fact the resilient characteristic of the diaphragms may accentuate these changes, since an increase in inlet pressure will tend to increase the area of the orifices through the diaphragms and increase the rate of flow through the emitter.

SUMMARY OF THE INVENTION

The present invention provides an emitter particularly adapted for drip irrigation systems which is not only self-purging but is also pressure responsive so that variations in inlet pressures to the emitter are automatically compensated.

Preferably the emitter consists of a resilient central body portion of rubber or the like disposed between opposed cover plates, although it will be apparent that other arrangements are possible within the scope of the present invention. Regardless of the specific configuration of the emitter a plurality of valves are provided disposed in the emitter flow path which are responsive to pressure changes to vary the area of the flow path at the valves and thereby maintain a substantially constant flow rate as long as the pressure experienced at a valve is below a predetermined maximum.

If a dirt particle or other foreign substance clogs the valve, the pressure drop across the clogged valve will then increase above this predetermined value and cause the valve to dump, purging the clogging materials and allowing the valve to return to its normal operating position.

In accordance with one preferred embodiment of the invention the emitter consists of a resilient central body portion having a series of openings formed therethrough interconnected by passages extending between adjacent openings at the tops and bottoms thereof to provide a series of interconnected openings defining the total flow path through the emitter. One cover plate is provided with an inlet in communication with the furthermost upstream of the openings and the other cover plate is provided with an outlet communicating with the furthermost downstream of the openings.

In this embodiment each valve comprises a lip extending across an opening from one side thereof toward but spaced from the opposite side, with the lip extending in an upstream direction so that flow through the openings tends to close the valve.

In accordance with a second preferred embodiment of the invention, the central body portion of the emitter consists of a sheet of resilient material such as rubber, having a series of tongues cut through the sheet. The cover plates are contoured and each has a series of openings interconnected by passages. Inclined portions are formed in the cover plates which, when the cover plates are clamped together with the sheet between them, depress the tongues from the plane of the sheet and position them so that they extend across the openings in an upstream direction so that flow through the emitter tends to move the tongues toward a closed position.

The cover plates in both embodiments may be clamped in place on the central body portion by means of bolts or the like and in at least the first embodiment described above, increasing the clamping pressure on the central body portion will result in a decrease in the diameters of the openings through the central body portion, providing some degree of control over size of the openings and the flow rate through the emitter.

BRIEF DESCRIPTION OF THE DRAWINGS

FIG. 1 is a plan view of an emitter in accordance with a preferred embodiment of the invention;

FIG. 2 is a view through an assembled emitter as would be seen from approximately the position of line 2—2 of FIG. 1;

FIG. 3 is an enlarged perspective view of a portion of the central body portion of the emitter of FIGS. 1 and 2;

FIGS. 4 through 6 depict the action of the pressure responsive self-purging emitter valves;

FIG. 7 is a cross-sectional view through a second preferred embodiment of the invention;

FIG. 8 is a view taken substantially along line 8—8 of FIG. 7;

FIG. 9 is a partial exploded perspective view of a portion of the embodiment of FIG. 7;

FIG. 10 is a view of a modification of the emitter of FIGS. 1 through 6;

FIG. 11 depicts an additional modification;

FIG. 12 shows yet another modification of the emitter of FIGS. 1 through 6; and

FIG. 13 is a view taken along line 13—13 of FIG. 10.

DESCRIPTION OF THE PREFERRED EMBODIMENTS

With reference to FIGS. 1 through 3 of the drawings, it will be seen that an emitter 10 in accordance with a first embodiment of the invention consists of a central body portion 12 and outer cover plates 14 and 16 secured together by bolts or the like 17. The portion 12 is provided with a series of openings 18 which extend completely therethrough and are interconnected in series by passages 19 which extend between adjacent openings at the tops and bottoms thereof.

The furthermost upstream opening 18 communicates with an inlet 20 formed through cover plate 14 and the furthermost downstream opening 18 communicates with an outlet 21 formed in the cover plate 16. It will also be seen that the bolts 17 can be used to vary the clamping force of the plates 14 and 16 and thereby vary the area of the flow path through the resilient body portion 12.

Positioned within each opening 18 is a valve member 22 comprising a thickened base portion 24 and a lip or tongue 26 which projects outwardly from one side of the opening towards but spaced from the opposite side thereof to provide, under normal operating conditions, a flow path through the emitter.

This construcion can best be seen in FIGS. 4 through 6 wherein it will be seen that the base 24 of each valve is thickened as at 28 and filled in as at 30 at its upstream side to minimize the accumulation of small particles between the valve and the adjacent side of the opening 18.

Normal flow through the emitter is depicted in FIG. 4 with the valve lip or tongue 26 extending across the opening and projecting into the flow path in an upstream direction. When an increase in inlet pressure to the emitter occurs, the valve lip 26 moves downwardly as seen in FIGS. 4 through 6 toward the adjacent wall of the opening, decreasing the area of the flow path at that valve as best seen in FIG. 5 of the drawings and thereby maintaining a substantially constant flow rate.

Normally the pressure drop across each valve will be approximately equal to the total pressure drop across the emitter divided by the number of valves in the flow path. However, should the flow around the edge of a lip 26 become completely or substantially blocked, as for example when a dirt particle or particles or other object becomes lodged in the valve, the total pressure drop across the entire emitter will be concentrated at the particular valve which is clogged, causing the pressure drop at that valve to increase above a predetermined maximum value.

When the pressure at a valve increases above the predetermined maximum value the valve lip, as seen in FIG. 6, moves over center, purging the dirt particle or the like 32 and allowing the valve lip to spring back to its normal operating position shown in FIG. 4 of the drawings. Thus the present invention provides in a single component an emitter which is not only pressure responsive but automatically self-purging.

A second preferred embodiment of the invention is illustrated in FIGS. 7 through 9, wherein the essential components of an emitter 40 are shown as consisting of a resilient central body portion 42 and opposed cover plates 44 and 46, having aligned openings 48 formed therein. Adjacent openings 48 are interconnected by means of passages 50 which extend between adjacent openings 48 near the tops and bottoms thereof. While only a portion of a single row of openings and passages 48 and 50 are shown for simplicity, it will be understood that a plurality of interconnected rows, as in the embodiment of FIGS. 1 through 6, will usually be provided and a suitable inlet and outlet formed through the plates 44 and 46.

The central portion 42 has lips or tongues 52 cut therefrom in alignment with the openings 48 and when the central body portion 42 is clamped between the cover plates 44 and 46, inclined portions 54 and 55 of the cover plates depress the lips 52 out of the plane of the sheet 42 to provide the configuraton best seen in FIG. 7 of the drawings.

With this configuration the lips 52 behave similarly to the lips 26 in the preceding embodiment in that as pressure increases are encountered in the system, the lips 52 tend to move toward a closed position, decreasing the area of the flow path and thereby maintaining substantially constant flow through the emitter until a predetermined value is reached.

Beyond this point however, that is, when the flow path has been substantially closed by dirt particles or other foreign substances, the entire pressure drop across the emitter is concentrated at the clogged valve, causing the valve lip to travel over center, purging that valve and allowing the valve lip to then spring back to its normal position.

Turning now to FIG. 10 of the drawings, a modification of the embodiment of FIGS. 1 through 6 will be described. The embodiment of FIG. 10 is in all respects the same as the embodiment of FIGS. 1 through 6 except that the valves 62, instead of having a thickened base portion 24, have their downstream portions 64 extending parallel with the axis of the opening 65 from the root of the tongue or lip 66. This results in a semicircular opening 65 downstream of the member 66, as best seen in FIGS. 13 of the drawings, but a substantially circular opening 67 on the upstream side. As in the embodiments of FIGS. 1 through 6, adjacent openings are interconnected by passages 68.

The embodiment of the valve 72 shown in FIG. 11 is similar in many respects to that shown in FIGS. 1 through 6, but to further alleviate the problem of accumulation of material at the upstream side of the lip or tongue 76 the upstream surface 78 of the valve 72 slopes from the root of the lip 76 at its upstream surface back towards the opening 79.

FIG. 12 shows yet another modification of the design of FIGS. 1 through 6. As will be seen, the valve 82, both above and below the tongue 86 extends in a straight line as indicated at 87 and 88 to both provide a more rigid base for the tongue 86 and eliminate the problem of accumulation of materials at the upstream side of the tongue 86.

From the above it will be seen that the present invention provides an emitter which is not only self-purging but responsive to normally encountered changes in inlet pressures to provide substantially constant flow rates.

While the forms of apparatus herein described constitute preferred embodiments of the invention, it is to be understood that the invention is not limited to these precise forms of apparatus, and that changes may be made therein without departing from the scope of the invention.

What is claimed is:
1. A pressure responsive emitter comprising:
   a. an emitter body,
   b. means defining an inlet into said body and an outlet therefrom,
   c. a flow path through said body interconnecting said inlet and said outlet, d. a plurality of discrete valves each positioned in spaced relationship to each other along said flow path,
e. said valves being formed of an elastomeric material and each consisting of an individual lip cantilevered into said flow path from one wall portion thereof and cooperating about its periphery with opposing wall portions of said flow path to effect a valving action,
f. each of said valves being responsive, below a predetermined maximum pressure, to decrease the flow area of said flow path at that valve in response to increases in the pressure drop across that valve and, above a predetermined minimum pressure, to increase the area of said flow path at that valve in response to decreases in the pressure drop across that valve, and
g. each of said valves being responsive to an increase in the pressure drop across that valve above said predetermined maximum pressure to thereafter increase the area of said flow path at that valve and permit accumulated material to pass through that valve.

2. The emitter of claim 1 wherein:
a. said emitter body includes outer cover plates and a resilient central body portion.

3. The emitter of claim 2 wherein:
a. said central body portion includes a plurality of openings extending through said central body portion from one face thereof to the opposite face thereof,
b. said valves are disposed within and extend across said openings, and
c. passages are provided interconnecting adjacent openings in series to define said flow path.

4. The emitter of claim 3 wherein:
a. said interconnecting passages extend from opposite ends of said openings.

5. The emitter of claim 4 further comprising:
a. an inlet formed through one of said cover plates in communication with the furthermost upstream of said openings, and
b. an outlet formed through the other of said cover plates in communication with the furthermost downstream of said openings.

6. The emitter of claim 1 wherein:
a. said valve lips are angularly disposed in an upstream direction with respect to the axis of said flow path.

7. The emitter of claim 1 further comprising:
a. a thickened base portion joining each of said valve lips to said one wall portion of said flow path.

8. The emitter of claim 1 wherein:
a. a base portion extends from a root of said valve lip at the downstream surface thereof in a direction substantially parallel to the axis of said flow path.

9. The emitter of claim 1 wherein each of said valves further comprises:
a. a sloping surface extending in an upstream direction from a root of said valve lip at the upstream surface thereof.

10. The emitter of claim 1 wherein each of said valves further comprises:
a. thickened base portions extending from a root of said valve lip at both the upstream and downstream surfaces thereof in a direction substantially parallel to the axis of said flow path.

11. The emitter of claim 2 further comprising:
a. means for varying the clamping force with which said cover plates engage said central body portion to thereby distort said central body portion and vary the cross-sectional area of said flow path.

12. A pressure responsive emitter comprising:
a. an emitter body,
b. means defining an inlet into said body and an outlet therefrom,
c. a flow path through said body interconnecting said inlet and said outlet,
d. a plurality of valves positioned at spaced intervals in said flow path,
e. each of said valves being responsive, below a predetermined maximum pressure, to decrease the flow area of said flow path at that valve in response to increases in the pressure drop across that valve and, above a predetermined minimum pressure, to increase the area of said flow path at that valve in response to decreases in the pressure drop across that valve,
f. each of said valves being responsive to an increase in the pressure drop across that valve above said predetermined maximum pressure to thereafter increase the area of said flow path at that valve and permit accumulated material to pass through that valve,
g. said emitter body including outer, cover plates and a resilient central body portion,
h. each of said cover plates having a plurality of aligned openings extending from inner faces of said cover plates to a point short of outer faces thereof,
i. passages interconnecting adjacent openings in said cover plates,
j. said central body portion comprises a sheet-like member having tongues formed therein, and
k. said central body portion is disposed between said outer cover plates with said tongues projecting into said aligned openings in said cover plates.

13. The emitter of claim 12 further comprising:
a. inclined portions formed on each of said cover plates and deflecting said tongues formed in said sheet member out of the plane of said sheet member when said sheet member is engaged between said cover plates.

* * * * *